(12) United States Patent
Aoki (10) Patent No.: US 7,815,353 B2
(45) Date of Patent: Oct. 19, 2010

(54) HEADLIGHT DEVICE AND VEHICLE

(75) Inventor: Yasushi Aoki, Samutprakarn (TH)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 302 days.

(21) Appl. No.: 11/860,418

(22) Filed: Sep. 24, 2007

(65) Prior Publication Data

US 2008/0239736 A1    Oct. 2, 2008

(30) Foreign Application Priority Data

Sep. 29, 2006    (JP)    ............................. 2006-269996

(51) Int. Cl.
*B60Q 1/00* (2006.01)
(52) U.S. Cl. ...................... 362/539; 362/475; 362/351; 362/303
(58) Field of Classification Search ................. 362/539, 362/473, 475, 476, 351, 355, 521, 520, 511, 362/303, 298, 296.1
See application file for complete search history.

(56) References Cited

U.S. PATENT DOCUMENTS

| | | | | |
|---|---|---|---|---|
| 3,703,636 A | * | 11/1972 | Schmitt | 362/298 |
| 4,383,290 A | * | 5/1983 | Binder et al. | 362/518 |
| 5,353,204 A | * | 10/1994 | Kawamura | 362/538 |
| 5,546,284 A | * | 8/1996 | Harada | 362/487 |
| 5,681,104 A | * | 10/1997 | Chinniah et al. | 362/538 |
| 5,702,173 A | * | 12/1997 | Kawamura | 362/505 |
| 6,210,024 B1 | * | 4/2001 | Shida | 362/345 |
| 6,267,488 B1 | | 7/2001 | Muegge et al. | |
| 6,739,743 B2 | | 5/2004 | Koshiro et al. | |
| 6,799,872 B2 | * | 10/2004 | Kawai | 362/473 |
| 2003/0012030 A1 | | 1/2003 | Koshiro et al. | |
| 2004/0145898 A1 | * | 7/2004 | Ase et al. | 362/476 |
| 2005/0036326 A1 | * | 2/2005 | Van Duyn | 362/475 |

FOREIGN PATENT DOCUMENTS

| | | |
|---|---|---|
| DE | 19838911 A1 | 3/2000 |
| EP | 0961074 A2 | 12/1999 |
| FR | 2787864 A1 | 6/2000 |
| JP | 2526760 | 11/1996 |
| JP | 10214504 A | 8/1998 |

OTHER PUBLICATIONS

European search report for corresponding European application 09151092.5 lists the references above Jun. 5, 2009.

* cited by examiner

*Primary Examiner*—Jong-Suk (James) Lee
*Assistant Examiner*—Julie A Shallenberger
(74) *Attorney, Agent, or Firm*—Keating & Bennett, LLP (57) ABSTRACT

A headlight device that has a visual appearance of having a lamp body using a plurality of light sources, while only a single light source is used. A shielding wall shields light radiated from a headlight bulb, or light reflected by a reflector portion. The shielding wall is arranged between a front lens and the reflector portion.

16 Claims, 6 Drawing Sheets

HEADLIGHT DEVICE AND VEHICLE

RELATED APPLICATIONS

This application claims the benefit of priority under 35 USC 119 of Japanese patent application nos. 2006-269996, filed on Sep. 29, 2006, which application is hereby incorporated by reference in its entirety.

BACKGROUND OF THE INVENTION

1. Field of the Invention

The present invention relates to a headlight device for a vehicle including a light source such as a bulb, and a lamp body having a reflector and a front lens.

2. Description of Related Art

In a vehicle such as motorcycle, a headlight device is provided on the front of the vehicle, that is, forwardly of a handle.

A construction is known, in which a plurality of light sources, (two bulbs) is used (see, for example, page 3 and FIG. 8 of Japanese Utility Model Registration No. 2526760). Two lamp bodies including a reflector and a front lens are arranged in alignment in a vehicle width direction and bulbs, respectively, are mounted substantially centrally of the respective lamp bodies.

However, a headlight device using a plurality of light sources (bulbs) has a problem in that power consumption is increased as compared with a headlight device that uses a single light source. In some cases, such as in small-sized motorcycles, a headlight device having a plurality of bulbs cannot be used because of performance limitations on a battery and an alternator as mounted.

SUMMARY OF THE INVENTION

The invention has been thought of in view of this situation and provides a headlight device that has a visual appearance of a lamp body using a plurality of light sources, while only a single light source is used.

A first feature of the invention is a headlight device having a light source and a lamp body. The lamp body includes a reflector that reflects light radiated from the light source, and a front lens arranged forwardly of the light source when mounted on a vehicle. A shielding wall arranged between the front lens and the reflector shields at least one of light radiated from the light source and light reflected by the reflector.

According to the invention, because the shielding wall is arranged between the front lens and the reflector, it is difficult to directly and visually recognize the light source from the front of the headlight device. Also, since the shielding wall is arranged between the front lens and the reflector, the headlight device has a visually appearance as having a lamp body that uses a plurality of light sources.

Thus, the headlight device has a visual appearance as having a lamp body using a plurality of light sources, even though only a single light source is used.

A second feature of the invention is that the shielding wall is arranged between the front lens and the light source.

A third feature of the invention is that the shielding wall is arranged in front of the light source.

A fourth feature of the invention is that the light source is arranged substantially centrally of the lamp body in a widthwise direction.

A fifth feature of the invention is that the shielding wall is arranged along an inner side of the front lens.

A sixth feature of the invention is that the lamp body extends in a vehicle width direction in a state when the headlight device is mounted on the vehicle, and a width of an upper portion of the shielding wall in the vehicle width direction is larger than a width of a lower portion of the shielding wall in the vehicle width direction.

A seventh feature of the invention is that the shielding wall is gradually increased in width toward the upper portion from the lower portion.

An eighth feature of the invention is that a rear end of the shielding wall is positioned rearwardly of a front end of the reflector.

A ninth feature of the invention is that the shielding wall is heat-resistant to withstand heat generated from the light source.

A tenth feature of the invention is that the front lens is formed on an inner side thereof with an inner recess, which is concave toward the front, and the shielding wall enters into the inner recess.

An eleventh feature of the invention is an outer periphery cover arranged along an outer periphery of the front lens. The outer periphery cover includes a lens cover portion arranged outside the front lens and forwardly of the shielding wall, and an outer recess formed on an outer side of the front lens to be concave rearward. The lens cover portion enters into the outer recess.

A twelfth feature of the invention is that the shielding wall includes, in cross section along the vehicle width direction, a pair of longitudinal wall portions extending in a longitudinal direction and a widthwise wall portion provided between the pair of longitudinal wall portions to connect between central portions of the longitudinal wall portions in the longitudinal direction.

A thirteenth feature of the invention is an auxiliary lamp arranged outside the lamp body.

A fourteenth feature of the invention is that the auxiliary lamp includes an auxiliary light source and an outer reflector provided outside the reflector to reflect light of the auxiliary light source.

A fifteenth feature of the invention is an inner partition portion provided at a boundary of the reflector and the outer reflector to partition the reflector and the outer reflector. A predetermined clearance is defined between the inner partition portion and an inner side of the front lens.

A sixteenth feature of the invention is a direction indicator lamp arranged outside the auxiliary lamp that indicates a traveling direction of the vehicle. An outer partition portion is provided at a boundary of the direction indicator lamp and the auxiliary lamp to partition the direction indicator lamp and the auxiliary lamp. A height of the outer partition portion is larger than a height of the inner partition portion.

A seventeenth feature of the invention is a vehicle comprising the headlight device.

According to the invention, a headlight device with a lamp body having an appearance of using a plurality of light sources, while only a single light source is used.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention will now be described with reference to the drawings. The same or similar parts in the following figures are denoted by the same or similar reference numerals. It should be noted that the drawings are schematic and ratios of respective dimensions are different from actual ones.

Accordingly, specific dimensions should be determined taking the following description into consideration. There are of course parts that have dimensional relationships and ratios that are different from one another among the figures.

(1) Whole Schematic Construction

Figure 1:
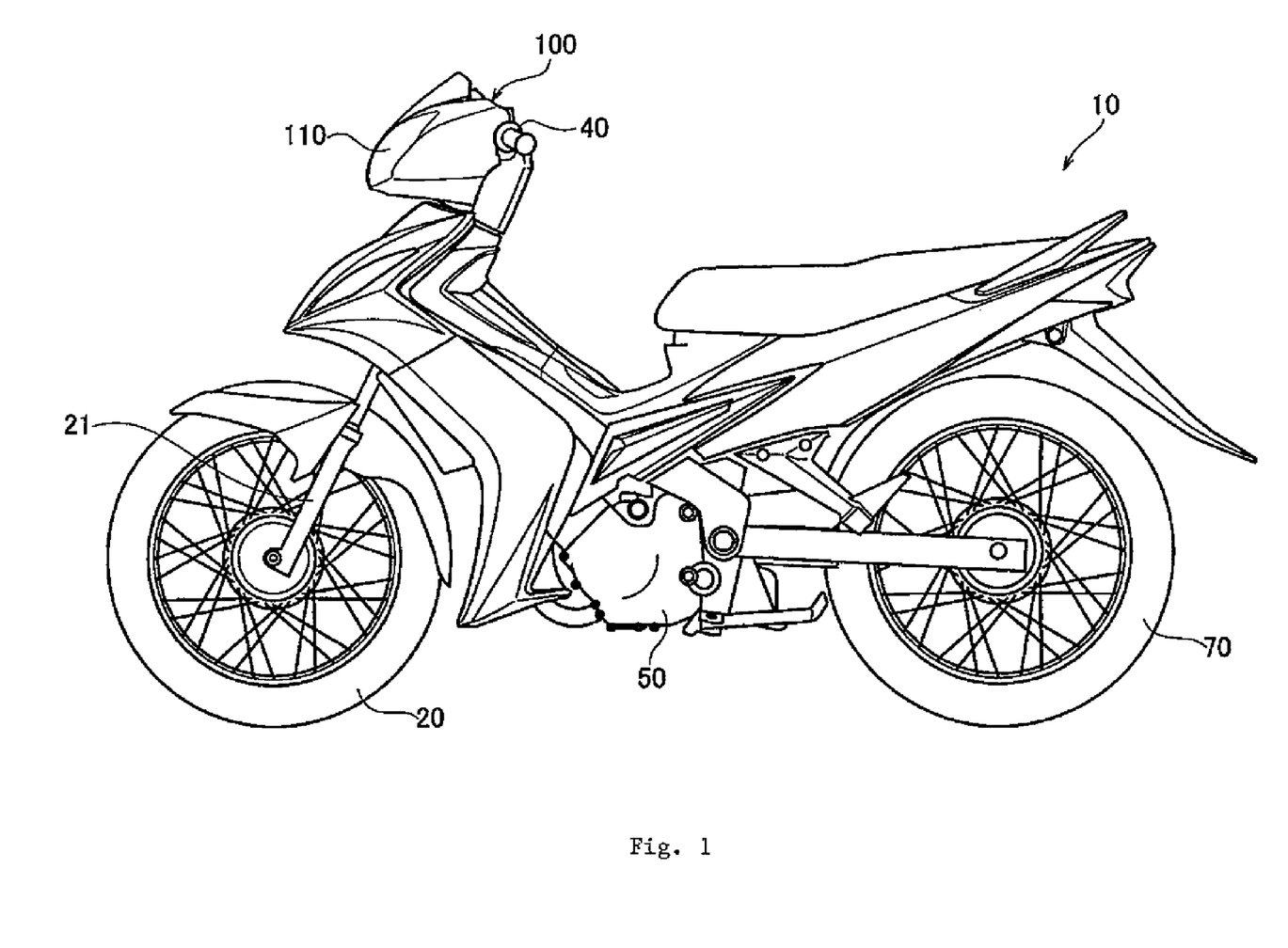
FIG. 1 is a left side view of a motorcycle according to an embodiment of the invention.

FIG. 1 is a left side view of a motorcycle 10. Motorcycle 10 is a so-called underbone type motorcycle, in which a body frame is arranged in a lower region as compared with a general saddle-type motorcycle.

Motorcycle 10 includes a front wheel 20 and a rear wheel 70. A driving force generated by an engine 50 drives rear wheel 70.

Motorcycle 10 includes a pair of left and right front forks 21 supporting front wheel 20 rotatably. Specifically, front forks 21 permit front wheel 20 to move (linear motion) in a vertical direction (specifically, a direction, in which a predetermined caster angle is given) according to road surface changes to absorb shocks that front wheel 20 receives.

A handle assembly 100 is provided above front forks 21. Handle assembly 100 comprises a handle 40, which a rider manipulates in order to change a direction of front wheel 20, and a headlight unit 110.

(2) Construction of a Headlight Device

The construction of headlight unit 110 is now explained.

(2.1) Whole Construction

Figure 2:
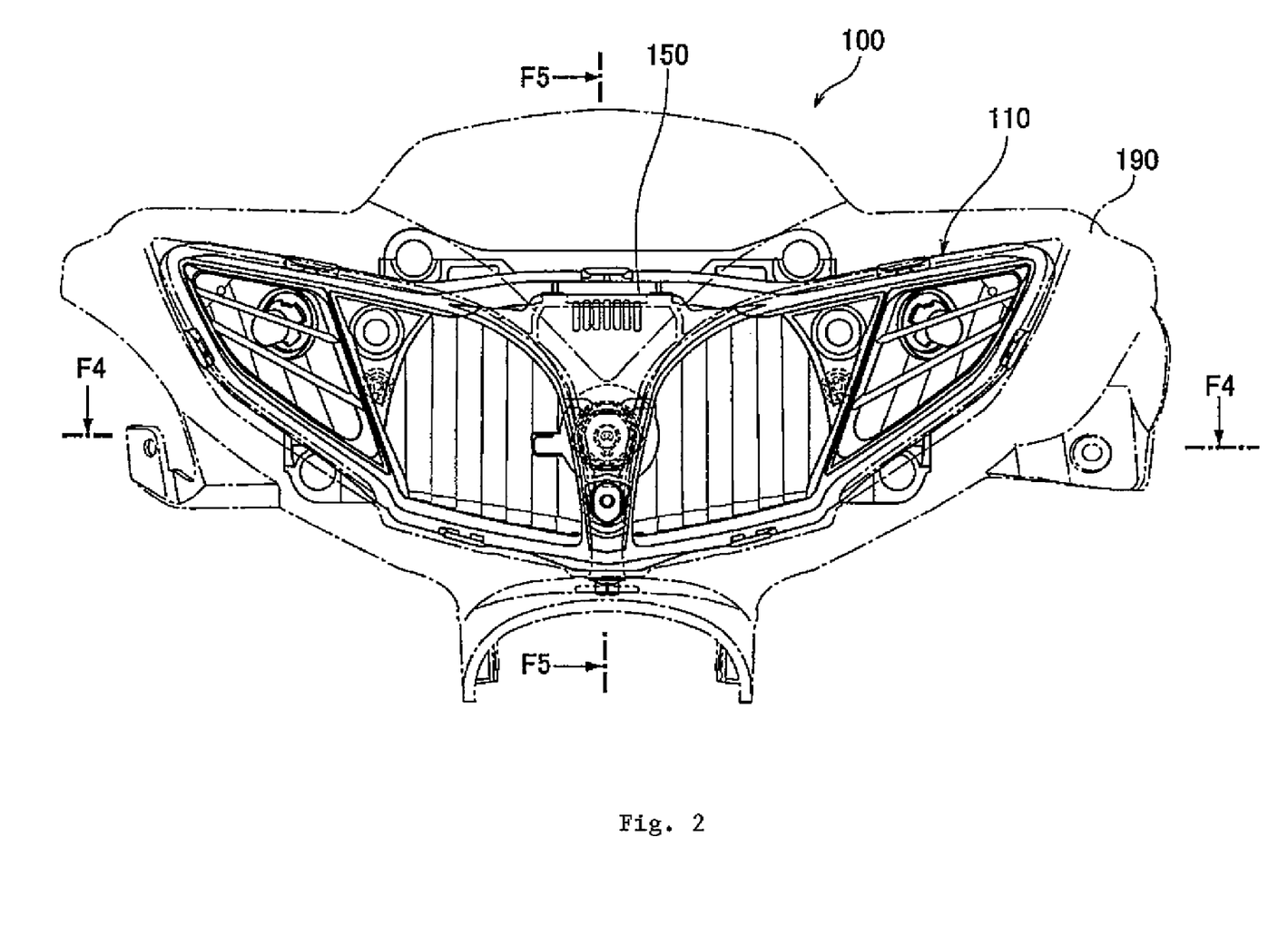
FIG. 2 is a front view of a handle assembly including a headlight device according to the embodiment of the invention.
Figure 3:
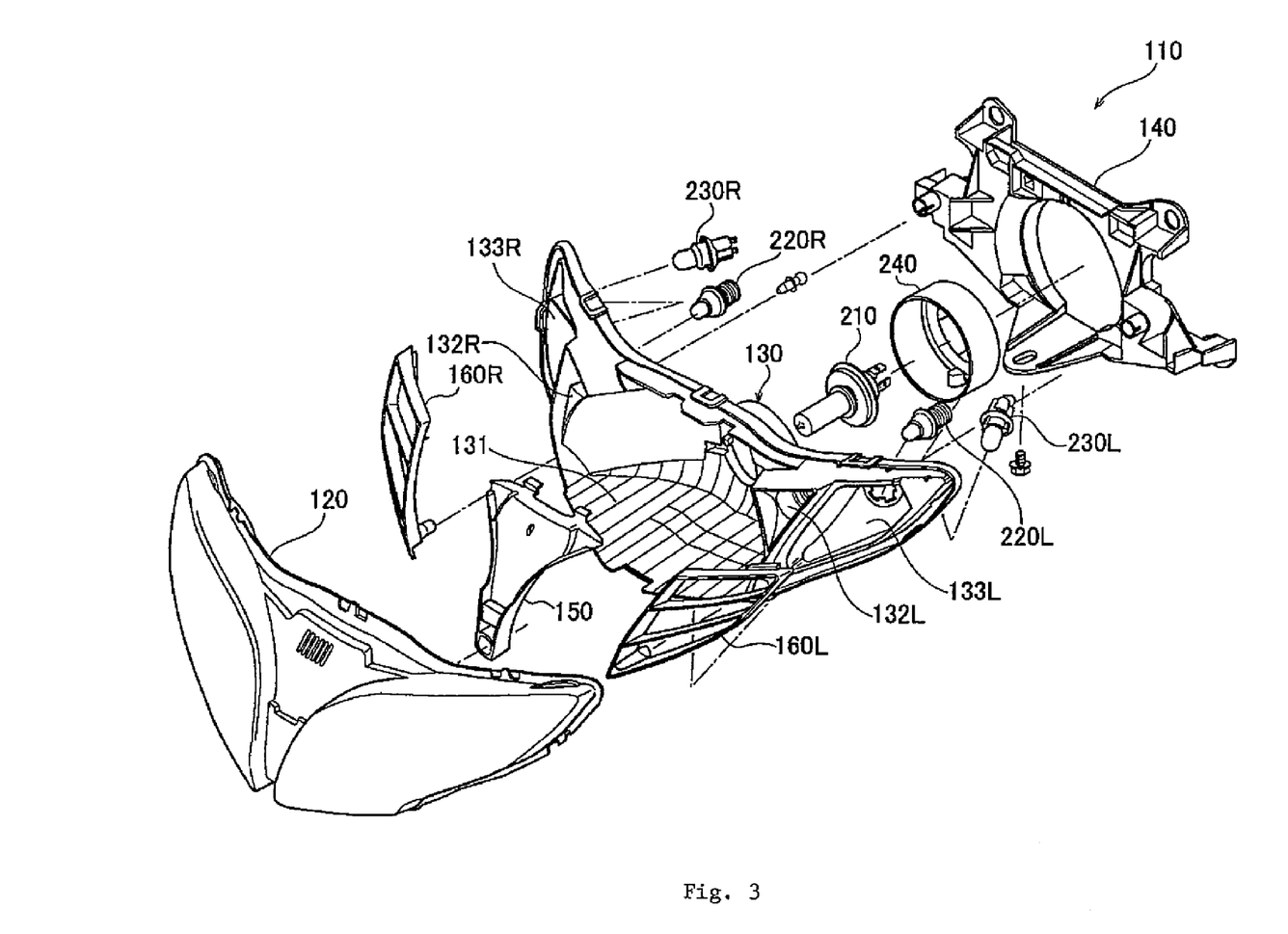
FIG. 3 is an exploded, perspective view of the headlight device according to the embodiment of the invention.

FIG. 2 is a front view showing handle assembly 100 including headlight unit 110. Handle assembly 100 includes headlight unit 110 and a handle cover 190 arranged outside headlight unit 110, specifically, along an outer periphery of a front lens 120 (FIG. 3). Handle cover 190 constitutes an outer periphery cover.

FIG. 3 is an exploded, perspective view of headlight unit 110. Headlight unit 110 includes front lens 120, a headlight body 130, and a headlight bracket 140.

Front lens 120 is arranged forwardly of a headlight bulb 210 when mounted on motorcycle 10 and is made of a transparent, synthetic resin. Light radiated from a headlight bulb 210 is transmitted through front lens 120 to irradiate the front of motorcycle 10. Headlight bulb 210 constitutes a light source.

Headlight body 130 is composed of a reflector portion 131, reflector portions 132L, 132R, and reflector portions 133L, 133R.

Reflector portion 131 reflects light radiated from headlight bulb 210, which is mounted to reflector portion 131. Reflector portion 131 constitutes a reflector.

Reflector portion 132L (132R) reflects light radiated from a position lamp 220L (220R) mounted to reflector portion 132L (132R). Position lamps 220L, 220R constitute an auxiliary light source, and reflector portion 132L (132R) constitutes an outer reflector.

Position lamp 220L (220R) has a position in motorcycle 10 to be recognized by other vehicles or the like. Position lamps 220L, 220R are lower in quantity of light than headlight bulb 210. An auxiliary lamp is constituted by reflector portion 132L (132R) and position lamp 220L (220R). Reflector portion 132L (132R) and position lamp 220L (220R) are arranged outside reflector portion 131 and headlight bulb 210.

Reflector portion 133L (133R) reflects light radiated from a flasher bulb 230L (230R) mounted to reflector portion 133L (133R).

Flasher bulb 230L (230R) flashes to indicate a traveling direction of motorcycle 10, specifically, a left direction or a right direction when motorcycle 10 changes its traveling direction. Flasher bulb 230L (230R) is mounted to reflector portion 133L (133R) provided outside reflector portion 132L (132R).

A direction indicator lamp is constituted by reflector portion 133L (133R) and flasher bulb 230L (230R). Reflector portion 133L (133R) and flasher bulb 230L (230R) are arranged outside reflector portion 132L (132R) and position lamp 220L (220R).

Headlight bracket 140 is fixed to handle cover 190 and supports front lens 120 and headlight body 130 in a fashion that enables movement in a vertical direction, that is, that enables aiming.

A shielding wall 150 is arranged between front lens 120 and headlight body 130. A louver 160L is arranged leftwardly laterally of shielding wall 150. A louver 160R is arranged rightwardly laterally of shielding wall 150.

Shielding wall 150 intercepts light radiated from headlight bulb 210 and light reflected by reflector portion 131. Shielding wall 150 is arranged between front lens 120 and reflector portion 131. Also, shielding wall 150 is arranged between front lens 120 and headlight bulb 210.

Louver 160L (160R) is formed from a plurality of plate-shaped portions that extend in a vehicle width (W) direction (see FIGS. 4 and 6), to restrict a traveling direction of light radiated from flasher bulbs 230L, 230R to a predetermined direction.

A socket cover 240 that covers a base of headlight bulb 210 is mounted to a rear portion of headlight body 130.

(2.2) Shape of and State of Arrangement of Shielding Wall

Figure 4:
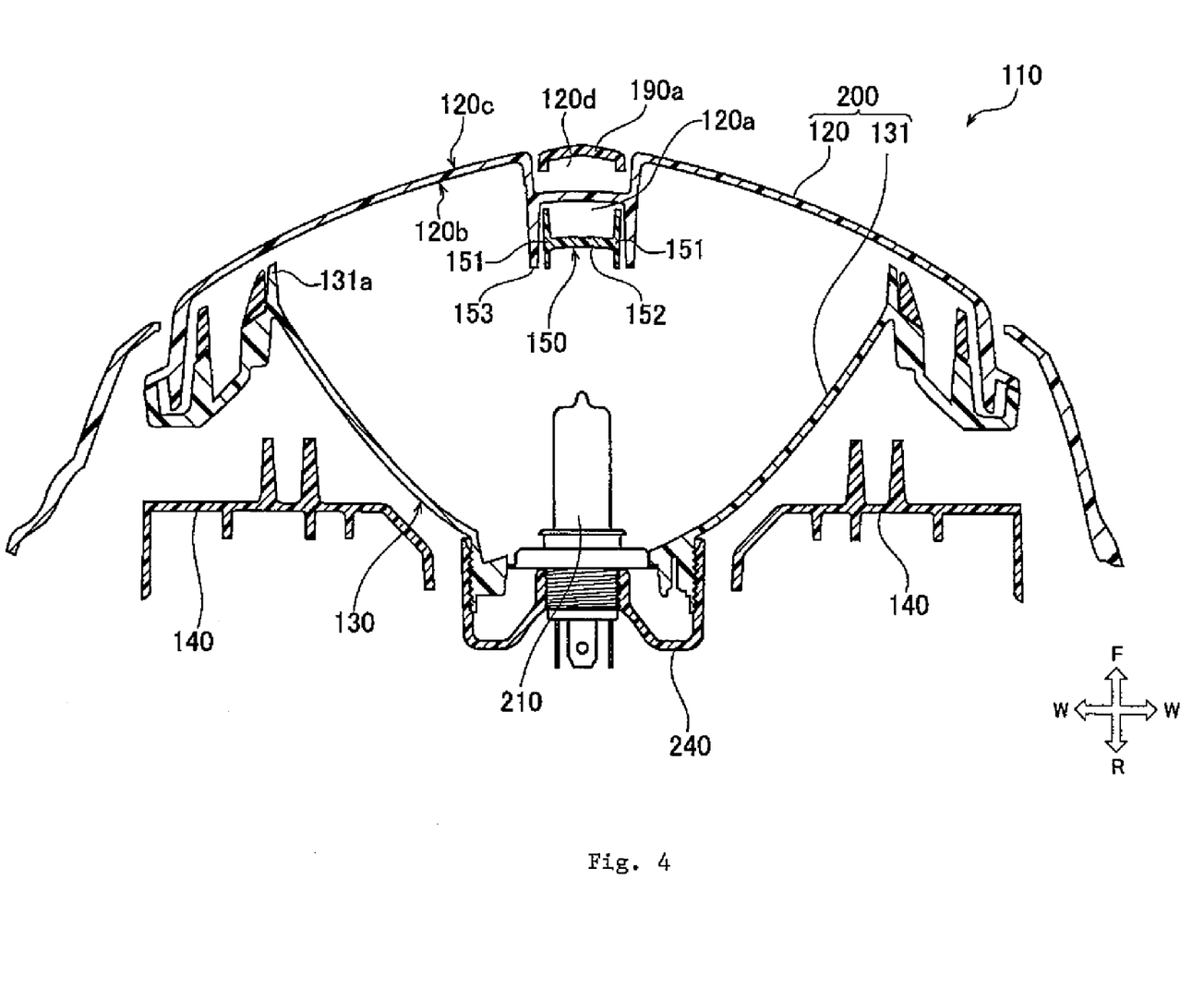
FIG. 4 is a cross sectional view taken along line F4-F4 of FIG. 2.
Figure 5:
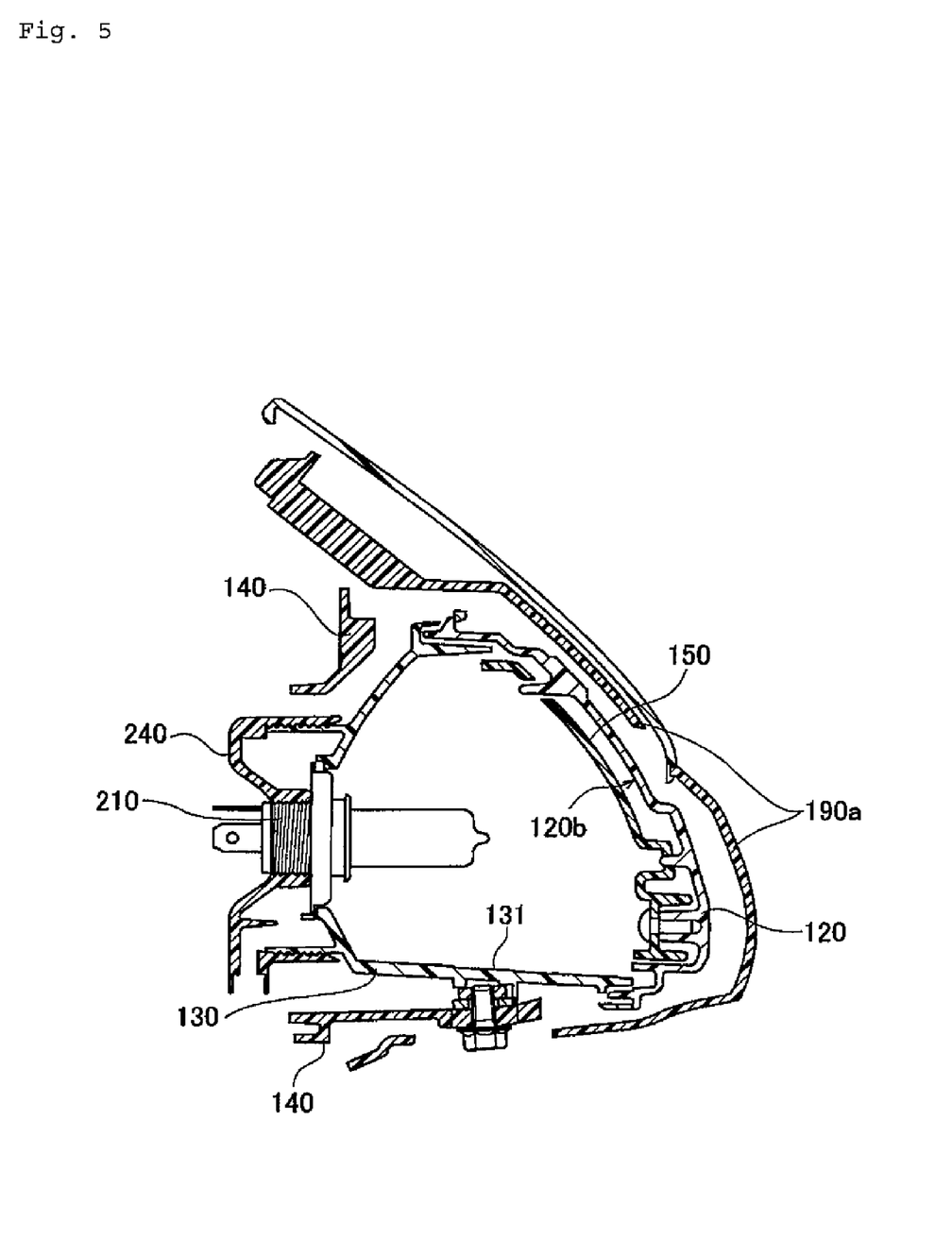
FIG. 5 is a cross sectional view taken along line F5-F5 of FIG. 2.
Figure 6:
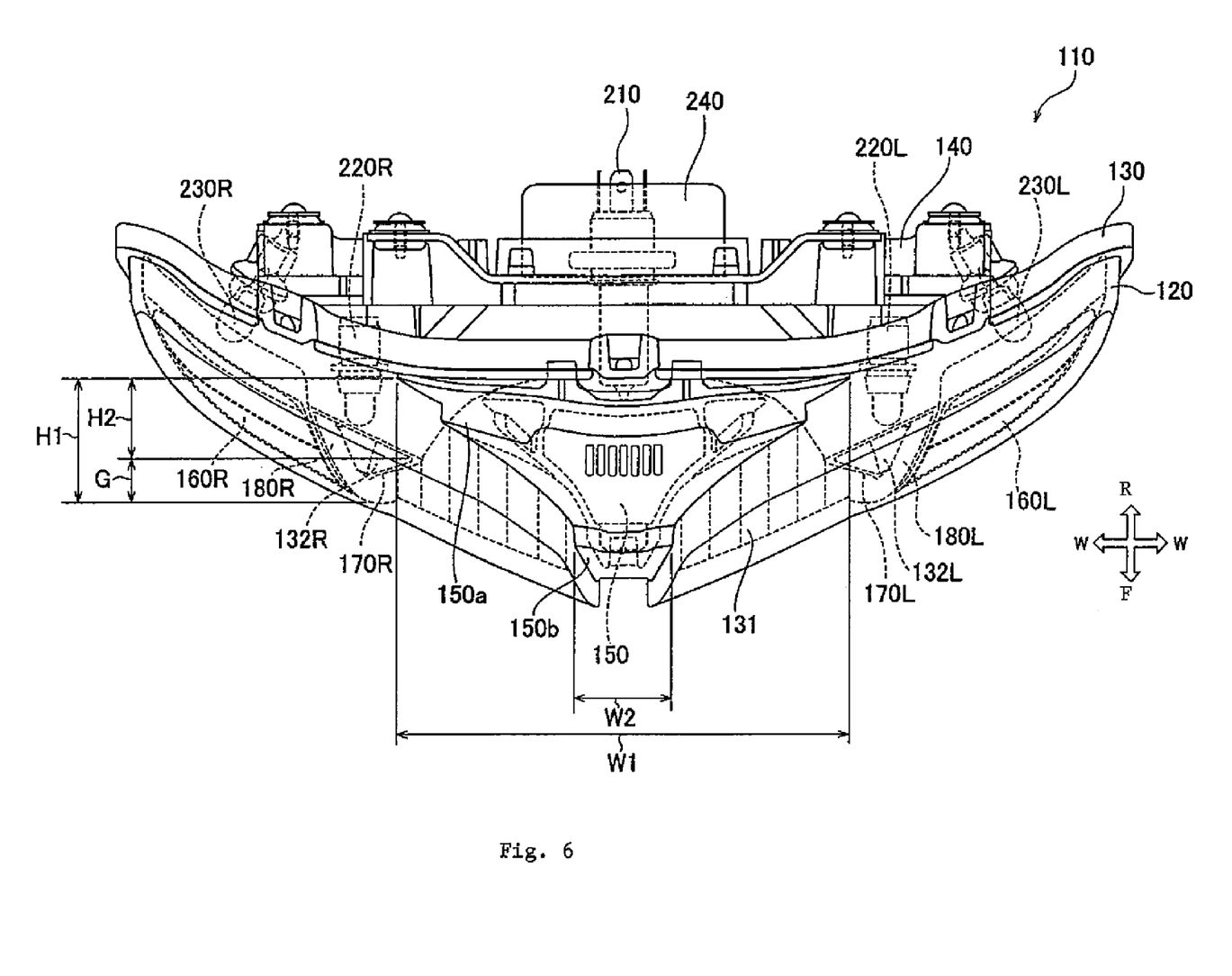
FIG. 6 is a plan view of the headlight device according to the embodiment of the invention.

The shape and state of arrangement of shielding wall 150 is now explained mainly with reference to FIGS. 4-6. FIG. 4 is a cross sectional view taken along line F4-F4 in FIG. 2. FIG. 5 is a cross sectional view taken along line F5-F5 in FIG. 2. FIG. 6 is a plan view of headlight unit 110.

As shown in FIG. 4, a lamp body 200 is constituted by front lens 120 and reflector portion 131. Lamp body 200 extends in the vehicle width (W) direction when headlight unit 110 is mounted on motorcycle 10. That is, lamp body 200 has a larger width than a height. Headlight bulb 210 is arranged substantially centrally of lamp body 200 in a width (W) direction.

Shielding wall 150 is arranged forwardly of headlight bulb 210, specifically, on the front of headlight bulb 210. As shown in FIGS. 4 and 5, an inner recess 120a that is concave toward the front is formed on an inner side 120b of front lens 120. Shielding wall 150 enters into inner recess 120a. Also, as shown in FIG. 5, shielding wall 150 is arranged along inner side 120b of front lens 120.

A lens cover portion 190a is arranged outside front lens 120 and forwardly of shielding wall 150. Lens cover portion 190a constitutes a part of handle cover 190 (see FIG. 2). An outer recess 120d that is concave rearward is formed on an outer side 120c of front lens 120. Lens cover portion 190a enters into outer recess 120d.

Shielding wall 150 is heat-resistant to withstand heat generated from headlight bulb 210. In one embodiment, shielding wall 150 is formed from PBT resin.

As shown in FIG. 4, shielding wall 150 includes, in cross section along the vehicle width (W) direction, a pair of longitudinal wall portions 151 extending in a longitudinal (F-R) direction, and a widthwise wall portion 152 provided between the pair of longitudinal wall portions 151 to connect between central portions of longitudinal wall portions 151 in the longitudinal direction. Rear ends 153 of shielding wall 150 are positioned rearwardly of front ends 131a of reflector portion 131.

As shown in FIG. 6, a lateral width W1 of an upper portion 150a of shielding wall 150 in the vehicle width direction is larger than a lateral width W2 of a lower portion 150b of shielding wall 150 in the vehicle width direction. As shown in FIGS. 2, 3, and 6, shielding wall 150 is gradually increased in lateral width toward upper portion 150a from lower portion 150b. That is, shielding wall 150 is shaped in front view as an inversed trapezoid.

(2.3) Shape of Reflector Portion

Shapes of reflector portion 131, reflector portions 132L, 132R, and reflector portions 133L, 133R are now further described with reference to FIG. 6.

As shown in FIG. 6, a partition 170L (170R) is provided at a boundary between reflector portion 131 and reflector portion 132L (132R) to partition reflector portion 131 and reflector portion 132L (132R). Partitions 170L, 170R constitute inner partition portions. A clearance G (predetermined clearance) is defined between partition 170L (170R) and inner side 120b of front lens 120.

Partitions 180L, 180R are provided at boundaries between a direction indicator lamp, which is constituted by reflector portion 133L (133R) and flasher bulb 230L (230R), and an auxiliary lamp, which is constituted by reflector portion 132L (132R) and position lamp 220L (220R), to partition a direction indicator lamp (specifically, reflector portion 133L (133R)) and an auxiliary lamp (specifically, reflector portion 132L (132R)). Partitions 180L, 180R constitute an outer partition portion.

A height H1 of partition 180L (180R) is larger than a height H2 of partition 170L (170R).

(Function/Effect)

With headlight unit 110, shielding wall 150 is arranged between front lens 120 and reflector portion 131, so that it is difficult to directly and visually recognize headlight bulb 210 from the front of headlight unit 110. Also, since shielding wall 150 is arranged between front lens 120 and reflector portion 131, headlight unit 110 has a visual appearance as being formed from a plurality of lamp bodies. Thus, headlight unit 110 appears to be a lamp body using a plurality of light sources, even though only a single headlight bulb 210 is used.

In the embodiment, shielding wall 150 is arranged between front lens 120 and headlight bulb 210. Also, shielding wall 150 is arranged on the front of headlight bulb 210. Headlight bulb 210 is arranged substantially centrally of lamp body 200 in a width (W) direction. Further, lateral width W1 of upper portion 150a of shielding wall 150 is larger than lateral width W2 of lower portion 150b.

Therefore, it is difficult to directly and visually recognize headlight bulb 210 from the front of headlight unit 110. Also, shielding wall 150 is gradually increased in lateral width toward upper portion 150a from lower portion 150b. Therefore, influence of light radiated from headlight bulb 210 on light distribution is suppressed, and headlight bulb 210 is hard to directly and visually recognize from the front of headlight unit 110 and from above the front.

In the embodiment, shielding wall 150 is arranged along inner side 120b of front lens 120. Therefore, shielding wall 150 does not excessively approach headlight bulb 210 or have adverse influences on distribution of light radiated from headlight bulb 210.

In the embodiment, a rear end 153 of shielding wall 150 is positioned rearwardly of front ends 131a of reflector portion 131. Thus, headlight unit 110 cannot be visually recognized on one side (right side) over front lens 120 from the other side (for example, a left side). Therefore, shielding wall 150 and reflector portion 131 have the appearance of being connected to each other, so it is not readily recognized that a single headlight bulb 210 is provided even in the case where front lens 120 is looked in.

In the embodiment, shielding wall 150 is heat-resistant to withstand heat generated from headlight bulb 210. Specifically, shielding wall 150 is formed from PBT resin. Therefore, shielding wall 150 can approach headlight bulb 210 up to the point where a further approach would have an adverse influence on distribution of light radiated from headlight bulb 210.

In the embodiment, shielding wall 150 enters into inner recess 120a formed on inner side 120b of front lens 120. Also, shielding wall 150 includes the pair of longitudinal wall portions 151 and widthwise wall portion 152 provided between the pair of longitudinal wall portions 151 to connect between the central portions of longitudinal wall portions 151.

That is, as shown in FIG. 4, shielding wall 150 is substantially H-shaped in cross section along a widthwise direction of headlight unit 110. Therefore, the heat of headlight bulb 210 is not transmitted to shielding wall 150. Also, shielding wall 150 enters into inner recess 120a to provide a predetermined clearance between it and inner recess 120a. Therefore, the heat of headlight bulb 210 is not transmitted to front lens 120 through shielding wall 150.

In the embodiment, lens cover portion 190a is arranged forwardly of shielding wall 150. Also, outer recess 120d being concave rearward is formed on outer side 120c of front lens 120 and lens cover portion 190a enters into outer recess 120d. Therefore, lens cover portion 190a approaches shielding wall 150.

When lens cover portion 190a arranged on outer side 120c of front lens 120 approaches shielding wall 150, shielding wall 150 is not readily seen from outside headlight unit 110, which improves the outward appearance of motorcycle 10.

In the embodiment, the auxiliary lamps, specifically, reflector portions 132L, 132R and position lamps 220L, 220R are arranged outside lamp body 200. Position lamps 220L, 220R are positioned outside lamp body 200 on left and right sides of lamp body 200. Therefore, while a single headlight bulb 210 is used, headlight unit 110 has an appearance of having a plurality of lamp bodies.

Also, in the embodiment, reflector portions 132L, 132R are used. Further, the clearance G is defined between partitions 170L, 170R and inner side 120b of front lens 120. Light of position lamps 220L, 220R reaches that left side portion (right side portion) of lamp body 200, which is compartmented by shielding wall 150, through clearance G. Therefore, while a single headlight bulb 210 is used, headlight unit 110 has an appearance of having a plurality of lamp bodies.

In the embodiment, height H1 of partition 180L (180R) is larger than height H2 of partition 170L (170R). Therefore, even when the direction indicator lamp (reflector portion 133L (133R) and flasher bulb 230L (230R)) is arranged outside the auxiliary lamp (reflector portion 132L (132R) and position lamp 220L (220R)), one can easily discriminate between the direction indicator lamp and the auxiliary lamp.

OTHER EMBODIMENTS

While the an embodiment of the invention has been described, it should not be understood that the invention is limited by the description and drawings, which constitute a part of the disclosure. Various alternative embodiments will be apparent from the disclosure to those skilled in the art.

For example, while the direction indicator lamp (reflector portion 133L (133R) and flasher bulb 230L (230R)) and the auxiliary lamp (reflector portion 132L (132R) and position lamp 220L (220R)) have been described as arranged outside lamp body 200, the direction indicator lamp or the auxiliary lamp may not be arranged outside lamp body 200.

The shape of shielding wall 150 shown in the embodiment is Just one example and may be changed according to the type of motorcycle and the shape of the headlight unit. Also, shielding wall 150 may not necessarily be arranged between front lens 120 and headlight bulb 210.

While shielding wall 150 in the embodiment has been described as formed by PBT resin, shielding wall 150 may be formed from other heat-resistant resins. Alternatively, heat-resistant coating may be applied to shielding wall 150.

While lamp body 200 has been described as having a larger width than height, it may have a larger height than width.

In this manner, the invention includes various other embodiments not specifically described herein. Accordingly, the scope of the invention should be determined only by the appended claims, which are appropriate in the light of the description.

The invention claimed is:

1. A headlight device comprising:
   a single light source;
   a lamp body including a reflector arranged to reflect light radiated from the single light source, and a front lens arranged forwardly of the single light source when mounted on a vehicle; and
   a shielding wall arranged to shield at least one of light radiated from the single light source and light reflected by the reflector; wherein
   the shielding wall is mounted to a portion of the front lens to separate the front lens into a plurality of portions and arranged in front of the single light source and between the front lens and the reflector;
   the shielding wall divides at least one of the light radiated from the single light source and light reflected by the reflector into the plurality of portions of the front lens such that the single light source provides an appearance of a plurality of light sources;
   the front lens includes an inner recess on an inner side of the front lens, the inner recess opening rearwardly; and
   the shielding wall is arranged within the inner recess.

2. The headlight device according to claim 1, wherein the shielding wall is arranged between the front lens and the single light source.

3. The headlight device according to claim 2, wherein the single light source and the shielding wall are arranged substantially centrally of the lamp body in a widthwise direction.

4. The headlight device according to claim 1, wherein the shielding wall is arranged along the inner side of the front lens.

5. The headlight device according to claim 1, wherein the lamp body extends in a vehicle width direction when the headlight device is mounted on the vehicle, and
   a width of an upper portion of the shielding wall in the vehicle width direction is larger than a width of a lower portion of the shielding wall in the vehicle width direction.

6. The headlight device according to claim 5, wherein the shielding wall is gradually increased in width toward the upper portion from the lower portion.

7. The headlight device according to claim 1, wherein a rear end of the shielding wall is positioned rearwardly of a front end of the reflector.

8. The headlight device according to claim 1, wherein the shielding wall is heat-resistant to withstand heat generated from the light source.

9. The headlight device according to claim 1, further comprising:
   an auxiliary lamp arranged outside the lamp body.

10. The headlight device according to claim 9, wherein the auxiliary lamp includes:
    an auxiliary light source, and
    an outer reflector provided outside the reflector to reflect light of the auxiliary light source.

11. The headlight device according to claim 10, wherein:
    an inner partition portion is provided at a boundary of the reflector and the outer reflector to partition the reflector and the outer reflector, and
    a predetermined clearance is defined between the inner partition portion and an inner side of the front lens.

12. A vehicle comprising the headlight device according to claim 1.

13. The headlight device according to claim 1, wherein the plurality of portions of the front lens includes a left portion and a right portion of the front lens.

14. A headlight device comprising:
    a single light source;
    a lamp body including a reflector arranged to reflect light radiated from the single light source, and a front lens arranged forwardly of the single light source when mounted on a vehicle; and
    a shielding wall arranged to shield at least one of light radiated from the single light source and light reflected by the reflector; wherein
    the shielding wall is mounted to a portion of the front lens to separate the front lens into a plurality of portions and arranged in front of the single light source and between the front lens and the reflector;
    the shielding wall divides at least one of the light radiated from the single light source and light reflected by the reflector into the plurality of portions of the front lens such that the single light source provides an appearance of a plurality of light sources; and
    the headlight device further comprises:
    an outer periphery cover arranged along an outer periphery of the front lens, wherein the outer periphery cover includes a lens cover portion arranged outside the front lens and forwardly of the shielding wall; and
    an outer recess formed on an outer side of the front lens to be concave rearward, wherein the lens cover portion enters into the outer recess.

15. A headlight device comprising:
    a single light source;

a lamp body including a reflector arranged to reflect light radiated from the single light source, and a front lens arranged forwardly of the single light source when mounted on a vehicle; and a shielding wall arranged to shield at least one of light radiated from the single light source and light reflected by the reflector; wherein the shielding wall is mounted to a portion of the front lens to separate the front lens into a plurality of portions and arranged in front of the single light source and between the front lens and the reflector;

the shielding wall divides at least one of the light radiated from the single light source and light reflected by the reflector into the plurality of portions of the front lens such that the single light source provides an appearance of a plurality of light sources;

the lamp body extends in a vehicle width direction when the headlight device is mounted on the vehicle;

a width of an upper portion of the shielding wall in the vehicle width direction is larger than a width of a lower portion of the shielding wall in the vehicle width direction; and the shielding wall includes, in cross section along the vehicle width direction:
  a pair of longitudinal wall portions extending in a longitudinal direction; and
  a widthwise wall portion provided between the pair of longitudinal wall portions to connect between central portions of the longitudinal wall portions in the longitudinal direction.

16. A headlight device comprising:

a single light source;

a lamp body including a reflector arranged to reflect light radiated from the single light source, and a front lens arranged forwardly of the single light source when mounted on a vehicle; and a shielding wall arranged to shield at least one of light radiated from the single light source and light reflected by the reflector; wherein the shielding wall is mounted to a portion of the front lens to separate the front lens into a plurality of portions and arranged in front of the single light source and between the front lens and the reflector;

the shielding wall divides at least one of the light radiated from the single light source and light reflected by the reflector into the plurality of portions of the front lens such that the single light source provides an appearance of a plurality of light sources;

the headlight device further comprises an auxiliary lamp arranged outside the lamp body, the auxiliary lamp includes:
  an auxiliary light source, and
  an outer reflector provided outside the reflector to reflect light of the auxiliary light source;

an inner partition portion is provided at a boundary of the reflector and the outer reflector to partition the reflector and the outer reflector;

a predetermined clearance is defined between the inner partition portion and an inner side of the front lens; and the headlight device further comprises:

a direction indicator lamp arranged outside the auxiliary lamp that indicates a traveling direction of the vehicle; and an outer partition portion provided at a boundary of the direction indicator lamp and the auxiliary lamp to partition the direction indicator lamp and the auxiliary lamp, wherein a height of the outer partition portion is larger than a height of the inner partition portion.

* * * * *